United States Patent
Kowase

(10) Patent No.: US 12,275,407 B2
(45) Date of Patent: Apr. 15, 2025

(54) ELECTRONIC CONTROL DEVICE FOR ESTIMATING A PRESENCE OF A VEHICLE INCAPABLE OF PERFORMING VEHICLE-TO-VEHICLE COMMUNICATION AHEAD OF A COMMUNICATION PARTNER VEHICLE

(71) Applicant: Hitachi Astemo, Ltd., Hitachinaka (JP)

(72) Inventor: Isao Kowase, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 235 days.

(21) Appl. No.: 17/922,516

(22) PCT Filed: Feb. 5, 2021

(86) PCT No.: PCT/JP2021/004267
§ 371 (c)(1),
(2) Date: Oct. 31, 2022

(87) PCT Pub. No.: WO2021/240897
PCT Pub. Date: Dec. 2, 2021

(65) Prior Publication Data
US 2023/0264694 A1    Aug. 24, 2023

(30) Foreign Application Priority Data
May 28, 2020    (JP) ................................. 2020-093095

(51) Int. Cl.
*B60W 30/18*    (2012.01)
*B60W 10/18*    (2012.01)
(Continued)

(52) U.S. Cl.
CPC ...... *B60W 30/18159* (2020.02); *B60W 10/18* (2013.01); *B60W 40/02* (2013.01);
(Continued)

(58) Field of Classification Search
None
See application file for complete search history.

(56) References Cited

U.S. PATENT DOCUMENTS 9,818,299 B1*   11/2017   Jammoussi ............ G08G 1/161
2005/0225457 A1   10/2005   Kagawa
2019/0304308 A1*  10/2019   Wei ....................... B60W 50/14

FOREIGN PATENT DOCUMENTS

JP    2005-301581 A    10/2005
JP    2007-137139 A    6/2007
(Continued)

*Primary Examiner* — James J Lee
*Assistant Examiner* — Andrew Sang Kim
(74) *Attorney, Agent, or Firm* — Volpe Koenig

(57) ABSTRACT

Provided is an electronic control device that estimates a presence of a vehicle incapable of performing vehicle-to-vehicle communication ahead of a communication partner vehicle is estimated.

An electronic control device 30 detects, on map data, an intersection 60 located ahead in a traveling direction of a host vehicle 10 based on location data and the map data of the host vehicle 10, calculates a stop position (first position) 71 where a communication partner vehicle 11 is supposed to pass through or stop when the communication partner vehicle 11 stops at the intersection 60, based on vehicle information of the communication partner vehicle 11 that is traveling toward the intersection 60, and determines whether or not there is another vehicle 13 ahead in the traveling direction of the communication partner vehicle 11, based on the stop position (first position) 71 and an intersection area 20 (second position 72) set before the intersection 60.

9 Claims, 7 Drawing Sheets

(51) Int. Cl.
*B60W 40/02* (2006.01)
*B60W 40/10* (2012.01)
*H04W 4/46* (2018.01)

(52) U.S. Cl.
CPC ......... *B60W 40/10* (2013.01); *B60W 2552/00* (2020.02); *B60W 2554/80* (2020.02); *H04W 4/46* (2018.02)

(56) References Cited

FOREIGN PATENT DOCUMENTS

| | | | |
|---|---|---|---|
| JP | 2016-177638 | A | 10/2016 |
| JP | 2017-182278 | A | 10/2017 |

* cited by examiner

ELECTRONIC CONTROL DEVICE FOR ESTIMATING A PRESENCE OF A VEHICLE INCAPABLE OF PERFORMING VEHICLE-TO-VEHICLE COMMUNICATION AHEAD OF A COMMUNICATION PARTNER VEHICLE

TECHNICAL FIELD

The present invention relates to an electronic control device.

BACKGROUND ART

Conventionally, use of a vehicle-to-vehicle communication system (V2V), a vehicle-to-vehicle and road-to-vehicle communication system (V2X), and the like are expected as a measure for preventing a vehicle contact accident at a blind spot such as an intersection.

The vehicle-to-vehicle communication system can prevent mutual contact accidents by exchanging vehicle information including mutual location data and velocity data between vehicles equipped with vehicle-to-vehicle communication devices. However, a sufficient purpose cannot be achieved in a case where there are vehicles incapable of vehicle-to-vehicle communication, such as a case where a vehicle-to-vehicle communication device is not mounted or a case where its communication function is not working.

JP 2007-137139 A describes that a traveling locus of a communication partner vehicle is drawn based on vehicle information of the communication partner vehicle obtained by a vehicle-to-vehicle communication system to estimate the presence of an obstacle on a road and secure safety for traveling of its own vehicle.

CITATION LIST

Patent Literature

PTL 1: JP 2007-137139 A

SUMMARY OF INVENTION

Technical Problem

In the invention described in JP 2007-137139 A, an obstacle is detected based on a traveling locus of another vehicle (vehicle-to-vehicle communication partner vehicle) on which a vehicle-to-vehicle communication device is mounted, and a forward obstacle (for example, a vehicle that is not equipped with a vehicle-to-vehicle communication device, a person, a two-wheeled vehicle, a stationary object, or the like) cannot be found unless the vehicle-to-vehicle communication partner vehicle performs a non-linear avoidance operation (for example, overtaking operation) of avoiding the obstacle (forward obstacle) located ahead. For example, such a traveling locus is not drawn on a road of one lane that cannot be overtaken, and it is difficult to detect a forward obstacle. In a case where a host vehicle travels toward an intersection on a road and a vehicle-to-vehicle communication partner vehicle travels, toward the intersection, on another road intersecting at the intersection, the front obstacle cannot be detected only by the vehicle-to-vehicle communication, and there is a high possibility of collision with the host vehicle unless the front obstacle stops at the intersection.

The present invention has been made to solve such a problem, and an object of the present invention is to provide a technique for estimating the presence of a vehicle incapable of vehicle-to-vehicle communication traveling ahead of a vehicle-to-vehicle communication partner vehicle.

Solution to Problem

The present application includes a plurality of means for solving the above problems, and as an example thereof, there is provided an electronic control device that is mounted in a first vehicle having a vehicle-to-vehicle communication device and controls the first vehicle based on vehicle information of another vehicle, the vehicle information being received by the vehicle-to-vehicle communication device, in which the electronic control device detects, on map data, an intersection located ahead in a traveling direction of the first vehicle based on location data and the map data of the first vehicle, calculates a first position where a second vehicle is supposed to pass through or stop when the second vehicle is to stop before the intersection, based on second vehicle information that is vehicle information of the second vehicle traveling toward the intersection and that is vehicle information of the second vehicle received by the vehicle-to-vehicle communication device, and determines whether or not there is a third vehicle ahead in a traveling direction of the second vehicle based on the first position and a second position that is set in front of the intersection on a road on which the second vehicle is traveling.

Advantageous Effects of Invention

According to the present invention, it is possible to provide a technique for estimating the presence of a vehicle incapable of vehicle-to-vehicle communication ahead of a vehicle-to-vehicle communication partner vehicle.

Problems, configurations, operations, and effects of the present invention other than those described above will be clarified by the following description of embodiments.

DESCRIPTION OF EMBODIMENTS

Hereinafter, an embodiment of the present invention will be described in detail with reference to the drawings as appropriate.

First Embodiment

Figure 1:
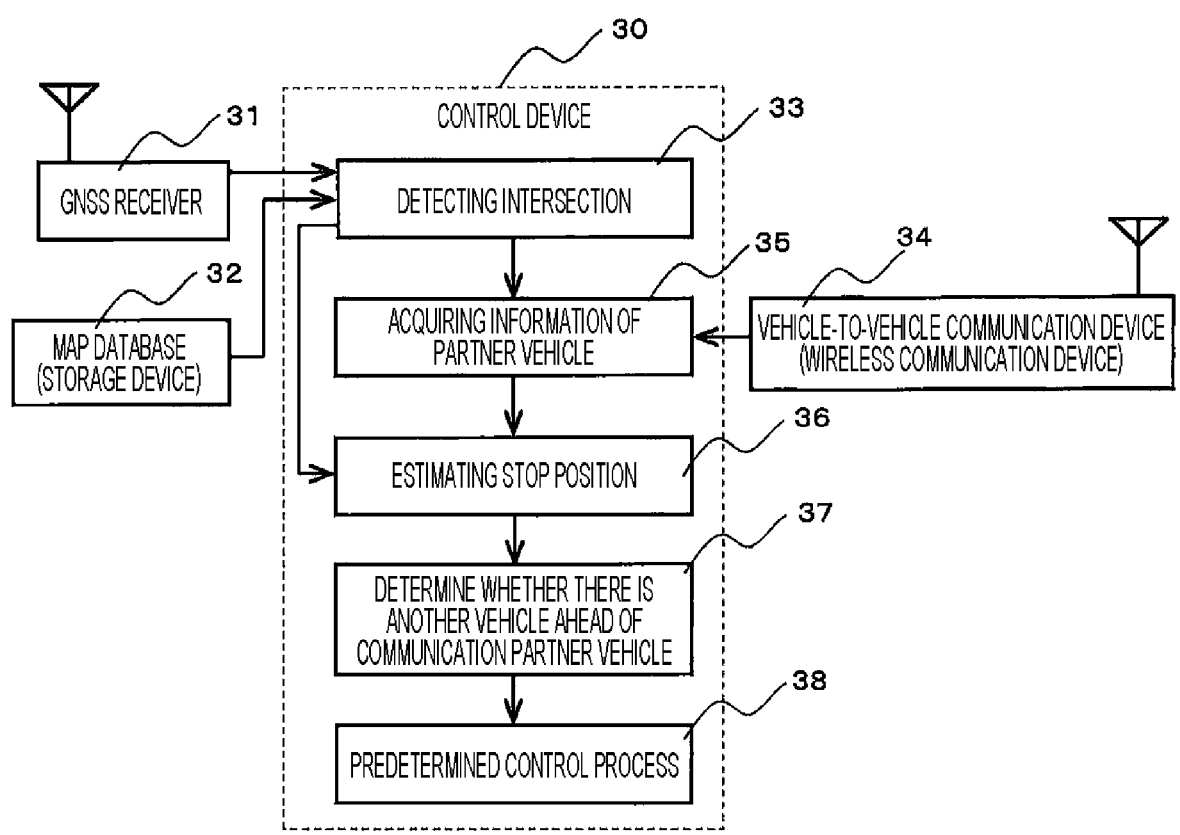
FIG. 1 is a block diagram of an apparatus constituting a vehicle-to-vehicle communication system according to a first embodiment of a present invention.
Figure 2:
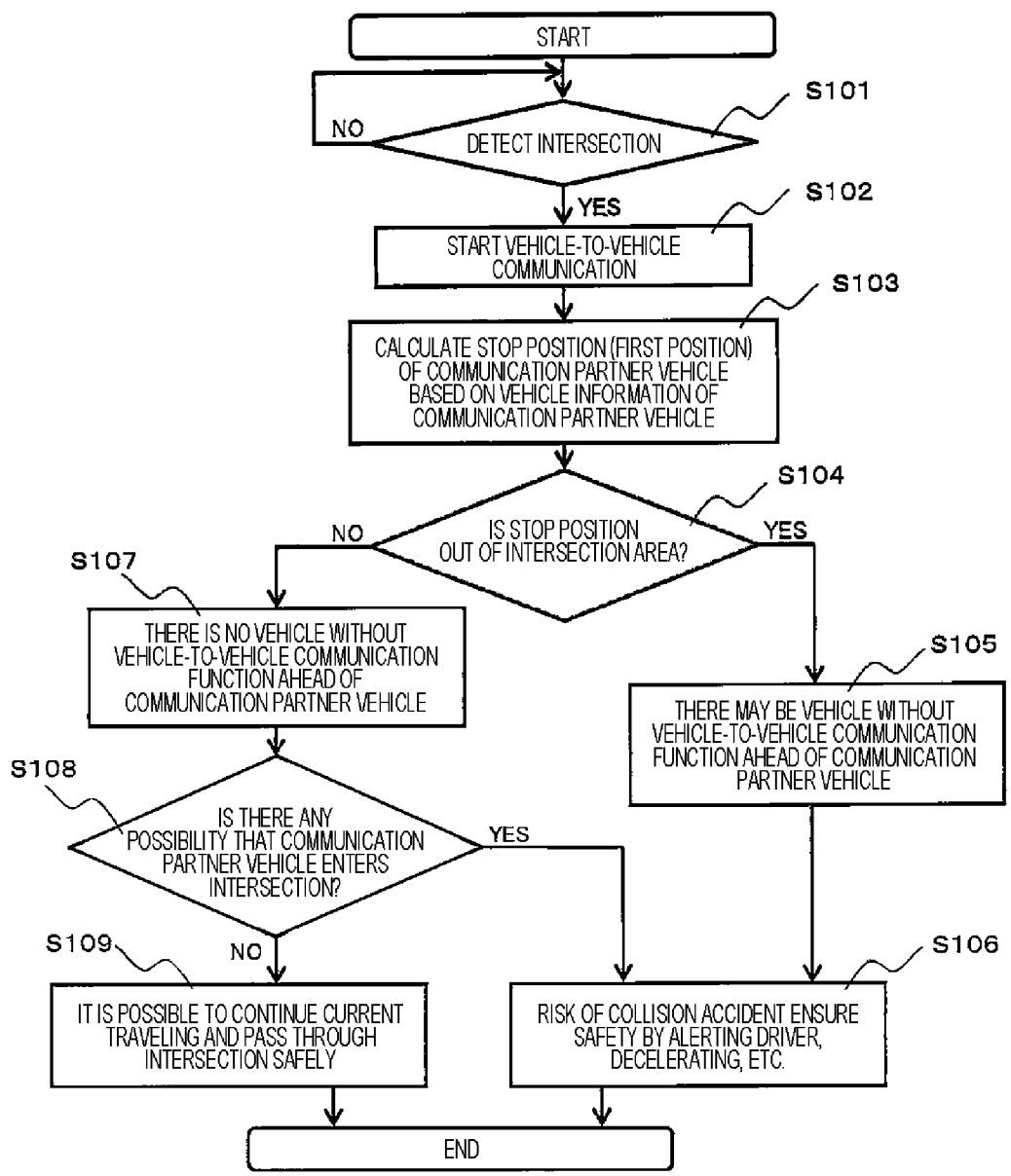
FIG. 2 is a flowchart of processes executed by the control device 30 according to the first embodiment of the present invention.

FIG. 1 is a system configuration diagram of a vehicle-to-vehicle communication system according to a first embodiment of the present invention. FIG. 2 is a flowchart of a process executed in the vehicle-to-vehicle communication system according to the first embodiment of the present invention.

Figure 3:
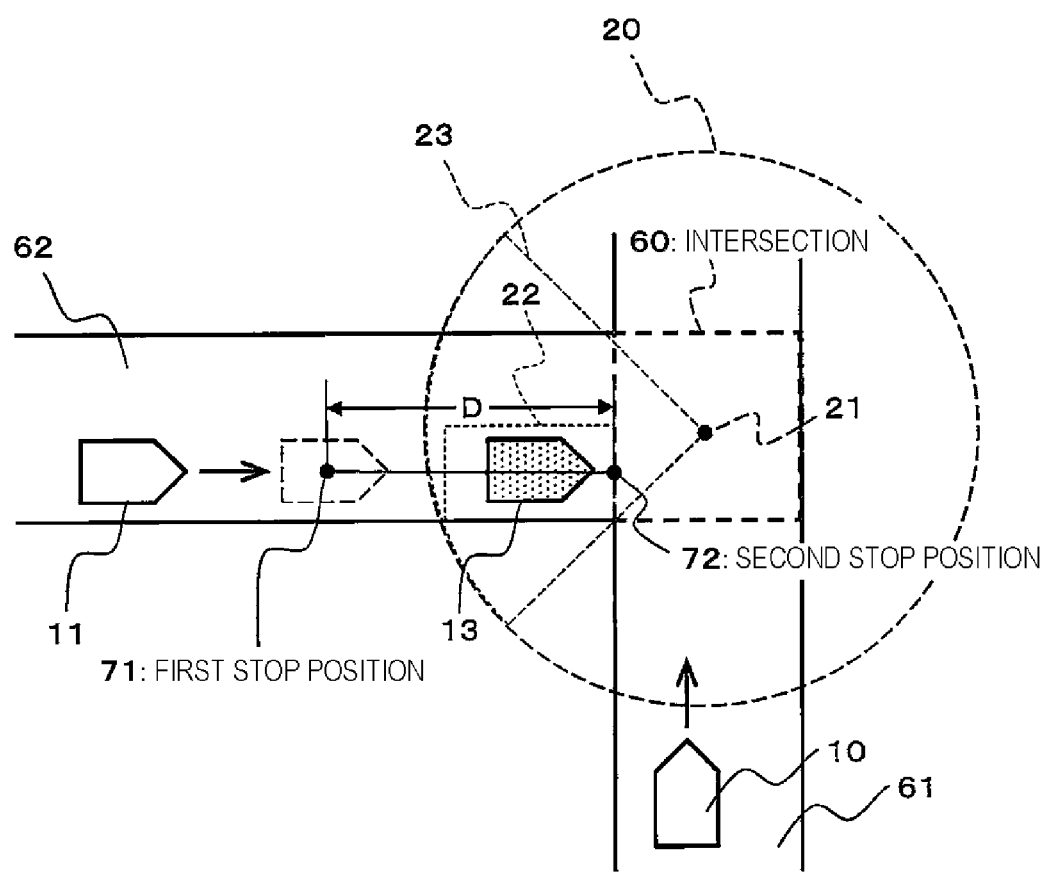
FIG. 3 is a diagram for explaining the operation of the vehicle-to-vehicle communication system according to the first embodiment of the present invention.

FIG. 3 is a diagram for describing an operation when the vehicle-to-vehicle communication system according to the first embodiment is applied to prevention of a collision accident at an intersection.

A vehicle 10 in FIG. 3 is a host vehicle (first vehicle), and is a vehicle equipped with the system illustrated in FIG. 1. A vehicle 11 is a vehicle capable of transmitting its vehicle information (collectively referred to as data acquired by the vehicle 11 and including, for example, location data and velocity data) to the host vehicle 10, and is equipped with a vehicle-to-vehicle communication device (wireless communication device) 34 (FIG. 1). The vehicle 11 is a communicating vehicle (second vehicle) communicating with the host vehicle 10 in the vehicle-to-vehicle communication. The vehicle (third vehicle) 13 is a vehicle that cannot transmit its vehicle information (collectively referred to as data acquired by the vehicle 13 and including, for example, location data and velocity data) to the host vehicle 10, and is a vehicle that is not equipped with the vehicle-to-vehicle communication device 34, for example.

Here, the host vehicle 10 on which the system illustrated in FIG. 1 is mounted will be described.

As illustrated in FIG. 1, the host vehicle 10 includes a GNSS receiver 31 and a map database 32. GNSS is an abbreviation for Global Navigation Satellite System. The GNSS receiver 31 calculates location data (first location data) of the host vehicle 10 based on signals (navigation signals) from a plurality of positioning satellites received by an antenna. The map database 32 stores, as map data, location data of roads and intersections, and the like. The map database 32 may be stored in an external storage device capable of communicating with a control device 30 or may be stored in a storage device in the control device 30.

The host vehicle 10 includes a vehicle-to-vehicle communication device 34 which is a wireless communication device. By using the vehicle-to-vehicle communication device 34 to communicate with another vehicle (for example, a vehicle-to-vehicle communication partner vehicle 11 (hereinafter, also referred to as a communication partner vehicle 11)) also including the vehicle-to-vehicle communication device 34, it is possible to transmit and receive vehicle information to and from the other vehicle. The vehicle information may include, for example, vehicle location data calculated by the GNSS receiver 31, vehicle velocity data detected by a speed sensor, and brake data detected by a brake pedal operation amount sensor. The brake data may include, for example, a timing at which a brake operation is performed on the brake pedal and an operation amount (depression amount) of the brake operation.

The control device 30 is mounted on the host vehicle (first vehicle) 10. The control device 30 controls the host vehicle 10 based on vehicle information of another vehicle (for example, the vehicle (second vehicle) 11) received by the vehicle-to-vehicle communication device 34. The control device 30 is, for example, an electronic control device (ECU). The control device 30 can calculate at which location on the map the host vehicle 10 exists based on the current position of the host vehicle 10 obtained from the GNSS receiver 31 and the map data from the map database 32. In addition, the control device 30 can detect an intersection present ahead in the traveling direction of the host vehicle 10 using the location data of the host vehicle 10 acquired from the GNSS receiver 31 and the location data of the intersection acquired from the map database 32.

The control device 30 can execute a plurality of processes 33, 35, 36, 37, and 38 indicated by blocks in FIG. 1. The control device 30 includes an arithmetic device such as a CPU that executes a program and a storage device including a volatile memory and a nonvolatile memory, such as a RAM and a ROM. The control device 30 may have a configuration in which a program stored in the storage device is executed by the arithmetic device. The control device 30 may be configured in such a manner that processing is executed with hardware such as a logic circuit. The control device 30 may be configured to execute processing by a combination of software and hardware.

The process (intersection detection process) 33 of the control device 30 can detect, on the map data, an intersection 60 (see FIG. 3) located ahead in the traveling direction of the host vehicle 10 based on the current position (location data) of the host vehicle 10 acquired from the GNSS receiver 31 and the map data acquired from the map database 32. In addition, the control device 30 can detect that the host vehicle 10 is approaching the intersection 60 on the map (for example, that the distance between the host vehicle 10 and the intersection 60 is getting shorter or become a predetermined value or less).

The process (partner vehicle information acquisition process) 35 of the control device 30 is to acquire the vehicle information of the communication partner vehicle from the vehicle of the communicating partner (for example, the communication partner vehicle 11) by communicating via the vehicle-to-vehicle communication device 34. The vehicle information includes at least location data of the communication partner vehicle. The velocity data and brake data may be included.

The process (stop position estimation process) 36 of the control device 30 is to calculate (estimate) a stop position (which may be referred to as a first stop position or a first position) when the vehicle (second vehicle) of the communication partner stops before the intersection 60, based on the vehicle information (second vehicle information) of the vehicle (second vehicle (for example, the communication partner vehicle 11)) traveling toward the intersection 60 detected in the process 33 on a route different from the host vehicle 10, from pieces of the vehicle information of the communication partner vehicle acquired in the process 35.

The process (a process for determining whether there is another vehicle) 37 of the control device 30 determines whether there is another vehicle (a third vehicle (for example, the vehicle 13)) ahead in the traveling direction of the other vehicle (the second vehicle) based on a positional relationship between the stop position (the first stop position) of the communication partner vehicle (the second vehicle) calculated in the process 36 and the stop position (sometimes referred to as the second stop position or the second position) set before the intersection 60 on the road where the communication partner vehicle (the second vehicle) travels. More specifically, in the process 37, when distance D between the second stop position and the first stop position (see FIG. 3) is greater than a predetermined value, it may be determined that another vehicle (third vehicle (for example, vehicle 13)) is present.

In the process (predetermined control process) 38 of the control device 30, the predetermined control process is performed on the host vehicle 10 when it is determined in the process 37 that there is another vehicle (third vehicle) ahead of the communication partner vehicle (second vehicle). The predetermined control process may include control of the host vehicle 10 and/or warning to the driver of the host vehicle 10. The former control of the host vehicle 10 may include, for example, deceleration control and stop control of the host vehicle 10 by brake control of the host vehicle 10. Examples of the latter warning include a warning display on a display (notification device) installed in the driver's seat of the host vehicle 10 and a warning sound output via a speaker (notification device) installed in the driver's seat of the host vehicle 10.

When detecting an intersection 60 ahead in the traveling direction of the host vehicle 10 in the process 33 while the host vehicle 10 is traveling, the control device 30 of the host vehicle 10 acquires vehicle information including the location data of the communication partner vehicle 11 from the communication partner vehicle 11 located around the intersection via the vehicle-to-vehicle communication using the vehicle-to-vehicle communication device 34. The communication partner vehicle 11 (second vehicle) in the example of FIG. 3 is traveling toward the intersection 60 on a second road 62 (a road different from a first road 61) intersecting the intersection 60 located ahead in the traveling direction of the host vehicle 10 (first vehicle) traveling on the first road 61.

The control device 30 of the host vehicle 10 estimates an estimated stop position (first stop position) 71 (see FIG. 3) that is a position where the communication partner vehicle (second vehicle) 11 is estimated to stop based on the vehicle information including location data of the communication partner vehicle 11 acquired via the vehicle-to-vehicle communication. The first stop position 71 can be calculated based on location data and velocity data (vehicle information of the communication partner vehicle 11) of the communication partner vehicle (second vehicle) 11.

An intersection area (predetermined region) 20 is preset on the second road 62 on which the communication partner vehicle (second vehicle) 11 travels. A second stop position 72 is preset in the intersection area 20. The second stop position 72 is set on the second road 62 before the intersection 60 (an area close to second vehicle 11 with intersection 60 as a reference). The intersection area 20 in FIG. 3 is set on the second road 62 so as to include the entire intersection 60. However, the intersection area 20 is not limited to that illustrated in FIG. 3. For example, the intersection area 20 may be set on the second road 62 so as to be adjacent to the intersection 60 as in a rectangular region 22 in FIG. 3, or may be set on the second road 62 so as to include a part of the intersection 60 as in a fan-shaped region 23 in FIG. 3. A point 21 in FIG. 3 is a center point of the circular intersection area 20.

In a case where the estimated stop position (first stop position) 71 is outside the intersection area 20 (see FIG. 3), the control device 30 of the present embodiment determines that there is the vehicle 13 for which vehicle-to-vehicle communication is not available (this can also be referred to as a vehicle 13 whose location data the host vehicle 10 cannot acquire) ahead of the communication partner vehicle 11.

The purpose of setting the intersection area 20 in this manner is that, by determining whether or not the first stop position 71 is outside the intersection area 20, it can be easily determined whether or not the distance D (see FIG. 3) between the first stop position 71 and the second stop position 72 exceeds a predetermined value. In other words, these two determination methods essentially determine the same. The "predetermined value" in this case is a distance between the first stop position and the second stop position in a case where the foremost part of second vehicle 11 is located on the boundary line of intersection area 20.

The intersection area 20 in the example of FIG. 3 is a circular region centered on the center 21, which is the center position of the intersection detected in the process 33, and having a radius of a predetermined distance corresponding to data (intersection scale data) indicating the size of the intersection 60, data of a general size of various vehicles, and the like. The intersection scale data may include, for example, data such as a road width of a road and the number of roads that intersect in the intersection.

In a case where the control device 30 determines that there is the vehicle 13 incapable of vehicle-to-vehicle communication, the control device performs warning such as warning to the driver of the host vehicle 10 and/or performs deceleration control when the host vehicle 10 passes through the intersection 60. As a result, the host vehicle 10 can pass through the intersection 60 without coming into contact with another vehicle (for example, the vehicle 13).

The processes executed by the control device 30 will be further described with reference to the flowchart of FIG. 2.

The control device 30 executes the flowchart of FIG. 2 at a predetermined cycle, calculates the location of the host vehicle 10 based on the data of the GNSS receiver 31 and the map database 32, and executes the process 33 to detect the intersection 60 while the host vehicle 10 is traveling in step S101. The control device 30 repeats step S101 when any intersection cannot be detected, and proceeds to step S102 when the intersection 60 is detected.

In step S102, the control device 30 starts vehicle-to-vehicle communication using the vehicle-to-vehicle communication device 34 with the communication partner vehicle 11 approaching the intersection 60 detected in step 101 from, for example, a route different from the host vehicle 10.

In step S103, the control device 30 acquires vehicle information (including, location data and velocity data for example) of the communication partner vehicle 11 by the process 35, and calculates an estimated stop position (first stop position) 71 of the communication partner vehicle 11 before the communication partner vehicle 11 passes through the intersection 60 detected in step 101 (for example, the time at which the host vehicle 10 is estimated to pass through the intersection may be calculated and set based on the velocity data) by the process 36. For example, the control device 30 can obtain the estimated stop position (first stop position) 71 by calculation based on the current position of the communication partner vehicle 11 included in the location data and the velocity data of the communication partner vehicle 11 included in the vehicle information. The control device 30 can more accurately obtain the estimated stop position (first stop position) 71 by considering the brake data of the communication partner vehicle 11 included in the vehicle information.

In step S104, the control device 30 determines in the process 36 whether the estimated stop position (first stop position) 71 of the communication partner vehicle 11 estimated in the process 37 is outside the intersection area 20.

The control device 30 proceeds to step S105 when the determination result in step S104 is YES (when it is determined that the estimated stop position 71 is outside the intersection area 20), and proceeds to step S107 when the determination result is NO (when it is determined that the estimated stop position 71 is not out of the intersection area 20).

In step S105, the control device 30 determines, in the process 37, that there may be the vehicle 13 that cannot perform vehicle-to-vehicle communication ahead of the communication partner vehicle 11 that is outside the intersection area 20 and stopped. In this case, whether the vehicle 13 enters the intersection cannot be determined on the host vehicle 10 side based on the location data of the vehicle 13. Therefore, in some cases, a possibility that the host vehicle 10 comes into contact with the vehicle 13 when passing through the intersection cannot be denied.

In step S106, since there is a possibility of occurrence of a collision accident in which the host vehicle collides with another vehicle (the vehicle 13 in the case through step S105, and the communication partner vehicle 11 in the case through later described step S108), the control device 30 alerts the driver of the host vehicle 10 by outputting a warning sound or the like in the process 38. Instead of or in addition to the alerting process, the vehicle may be decelerated by brake control to ensure safety when passing through the intersection.

On the other hand, in step S107, the control device 30 determines that there is no possibility that the vehicle 13 incapable performing vehicle-to-vehicle communication enters the intersection from the side of the intersection when the host vehicle 10 passes through the intersection.

In step S108, the control device 30 determines that there is no vehicle 13 incapable of vehicle-to-vehicle communication, but there is a possibility of contact with the communication partner vehicle 11. Therefore, the control device 30 confirms the vehicle information (including the location data and the velocity data) of the communication partner vehicle 11 again in the process 35, and determines whether there is a possibility that the communication partner vehicle 11 enters the intersection in the process 36. The control device 30 can perform the determination in step S108 based on, for example, three of the location of the communication partner vehicle 11, the velocity of the communication partner vehicle 11, and the distance between the communication partner vehicle 11 and the intersection. In the host vehicle 10, the process proceeds to step S106 when the determination result in step S108 is YES (when it is determined that the communication partner vehicle 11 is likely to enter the intersection), and proceeds to step S109 when the determination result is NO (when it is determined that the communication partner vehicle 11 is not likely to enter the intersection).

In step S109, according to the determination in the process 37 and the vehicle information (including the location data and the velocity data) of the communication partner vehicle 11 acquired in the process 35, since there is no vehicle 13 incapable of performing vehicle-to-vehicle communication, and there is no possibility of a collision accident with the communication partner vehicle 11, the control device 30 determines that the vehicle can safely pass through the intersection at the current speed.

As described above, according to the present embodiment, even when there is the vehicle 13 that cannot perform vehicle-to-vehicle communication ahead of the communication partner vehicle 11 of vehicle-to-vehicle communication, the host vehicle 10 can detect the presence of the vehicle 13 that cannot perform the vehicle-to-vehicle communication. In addition, when detecting that there is the vehicle 13 incapable of vehicle-to-vehicle communication, the host vehicle 10 performs alerting the driver, deceleration control, and the like. As a result, the host vehicle 10 can pass through the intersection without coming into contact with the vehicle 13 incapable of vehicle-to-vehicle communication.

Second Embodiment

Figure 4:
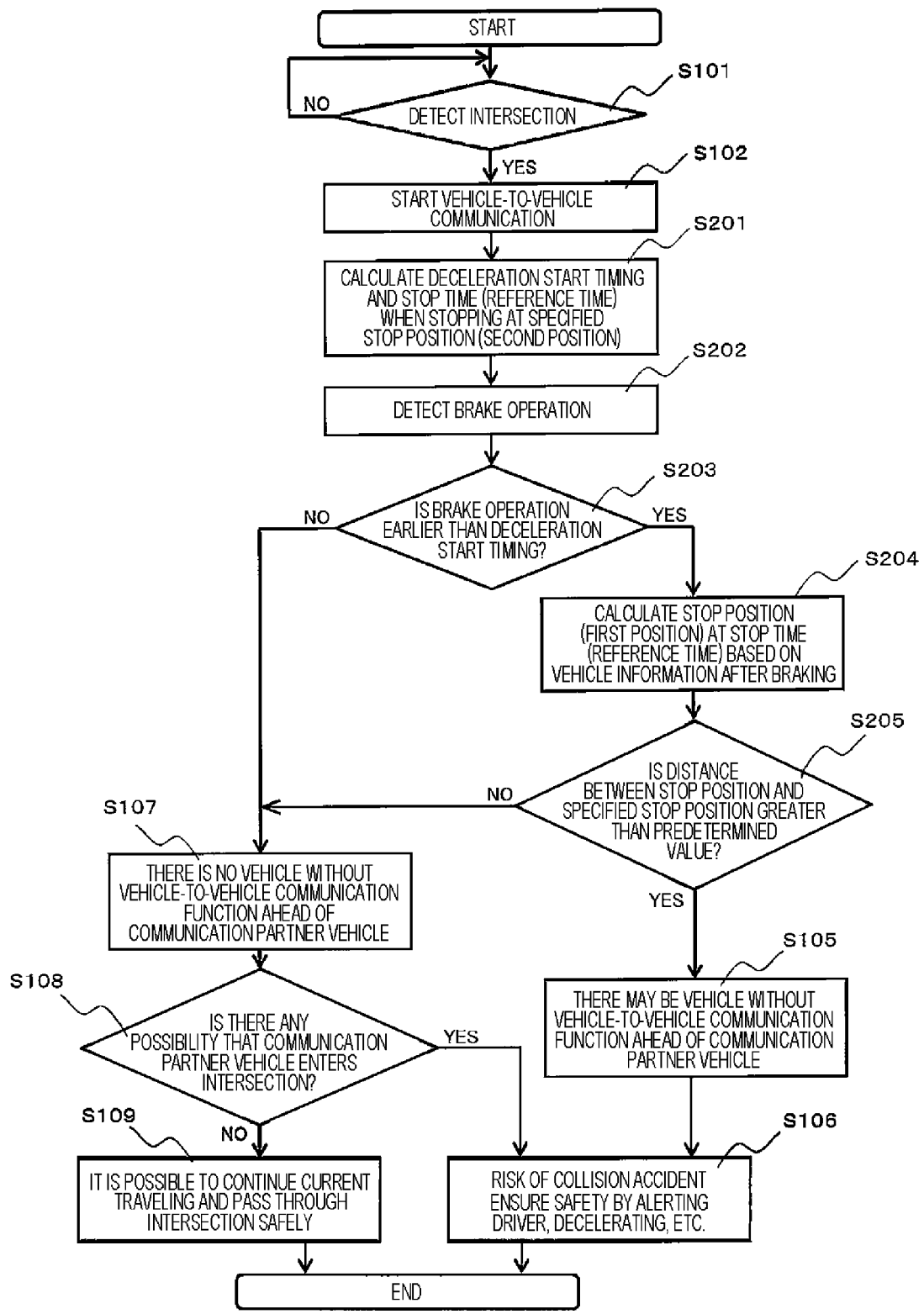
FIG. 4 is a flowchart of processes executed by a control device 30 according to a second embodiment of the present invention.
Figure 5:
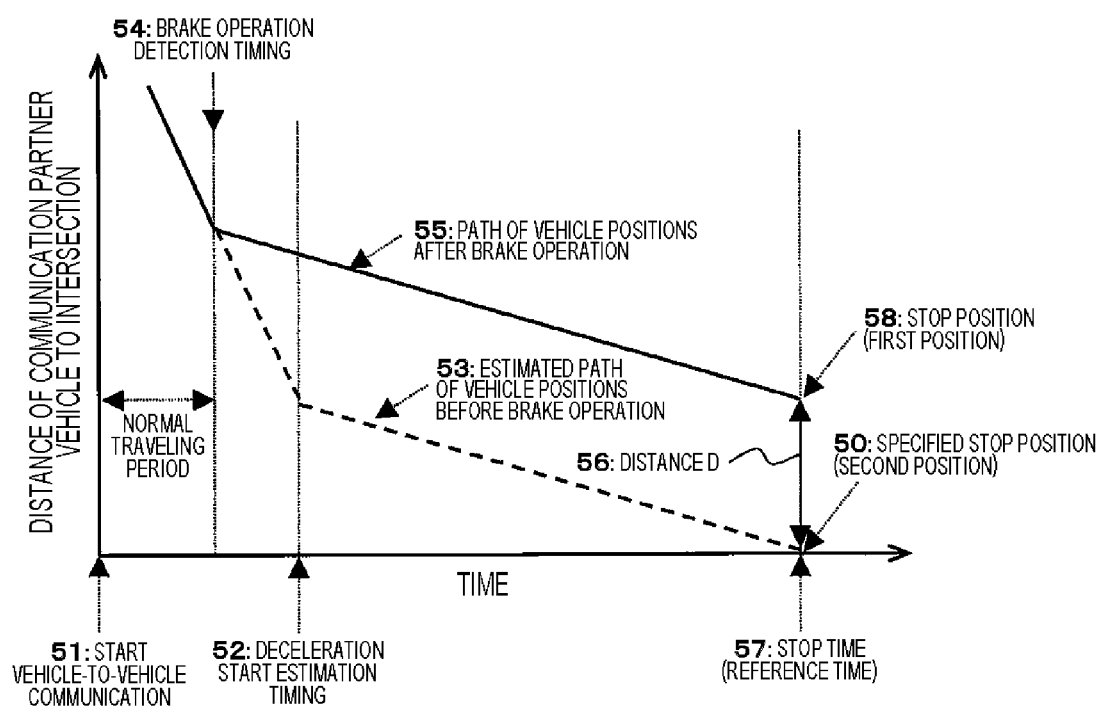
FIG. 5 is a diagram for explaining the operation of the vehicle-to-vehicle communication system according to the second embodiment of the present invention.

FIG. 4 is a flowchart of a process executed in the vehicle-to-vehicle communication system according to a second embodiment of the present invention. FIG. 5 is a diagram for explaining the operation of the vehicle-to-vehicle communication system according to the second embodiment of the present invention. Note that the configurations of FIGS. 1 and 3 used in the first embodiment are the same in the second embodiment, and thus the following description will be made with reference to FIGS. 1 and 3.

An outline of the second embodiment will be described with reference to FIG. 5. FIG. 5 is a diagram illustrating a distance from the communication partner vehicle 11 to a specified stop position 50 (for example, a position of a stop line before entering an intersection) with respect to an elapsed time from a timing 51, which is a timing at which the host vehicle 10 starts vehicle-to-vehicle communication with the communication partner vehicle 11. Note that, according to the present embodiment, the specified stop position 50 is the second position.

The control device 30 of the host vehicle 10 acquires the vehicle information (including location data, velocity data, and brake data) of the communication partner vehicle 11 which is the communication partner after the timing 51 when the vehicle-to-vehicle communication is started. The control device 30 of the host vehicle 10 calculates, based on the acquired vehicle information of the communication partner vehicle 11, a deceleration start estimation timing 52 which is a timing at which it is estimated that deceleration (brake operation) needs to be started in order for the communication partner vehicle 11 to stop at the specified stop position 50, an estimated path 53 which is estimated values of subsequent position changes of the communication partner vehicle 11, and a stop time (which may be referred to as a reference time) 57 which is a time when the communication partner vehicle 11 stops at the specified stop position 50.

The control device 30 of the host vehicle 10 calculates a timing (brake operation detection timing) 54 at which the brake operation is performed in the communication partner vehicle 11 based on the brake data included in the acquired vehicle information of the communication partner vehicle 11. The brake data includes, for example, an operation amount of the brake pedal (a depression amount of the brake pedal) of the communication partner vehicle 11 detected by an operation amount sensor, and the brake operation detection timing 54 can be calculated based on the brake data. When the brake operation detection timing 54 is earlier than the deceleration start estimation timing 52, the control device 30 of the host vehicle 10 calculates the stop position (first position) 58 of the communication partner vehicle 11 at the reference time (stop time) calculated before the brake operation detection timing 54 based on the vehicle information (including the location data and the velocity data) of the communication partner vehicle 11 acquired by the vehicle-to-vehicle communication after the brake operation detection timing 54 (that is, after the brake operation).

In calculating the stop position 58, the control device 30 may calculate a path 55 that is location changes of the communication partner vehicle 11 after the brake operation detection timing 54. The path 55 may be an estimated path calculated based on the location data and velocity data (vehicle information) of the communication partner vehicle 11, or may be an actual path defined by actual location data of the communication partner vehicle 11. The former method is advantageous in that the stop position 58 can be calculated earlier than the latter method, and the latter method is advantageous in that the stop position 58 can be calculated more accurately than the former method.

Next, the control device 30 of the host vehicle 10 calculates a distance D56 between the stop position (first position) 58 of the communication partner vehicle 11 and the specified stop position (second position) 50 at the reference time (stop time), and determines whether or not the distance exceeds a predetermined value d1. The predetermined value d1 can be determined based on the length of one vehicle, and can be longer than the length of one vehicle.

In a case where the distance D56 exceeds the predetermined value d1, the control device 30 determines that the communication partner vehicle 11 stops before the specified stop position 50 and there is the vehicle 13 incapable of vehicle-to-vehicle communication ahead of the communication partner vehicle 11. As a result, the control device 30 performs alerting the driver of the host vehicle 10 or deceleration control, similarly to the first embodiment.

Note that the specified stop position 50 is not limited to the stop line at the intersection 60, and may be another stop line, a boundary line of the intersection, or any other position where the vehicle should stop.

The processes executed by the control device 30 according to the second embodiment will be further described with reference to the flowchart of FIG. 4. The same processes as those in the flowchart of FIG. 1 are denoted by the same reference numerals, and the description thereof may be omitted as appropriate.

In step 201, the control device 30 calculates the deceleration start estimation timing 52 and the stop time (reference time) 57 when the communication partner vehicle 11 stops at the specified stop position 50 based on the location data and the velocity data (vehicle information) of the communication partner vehicle 11 acquired from step S102.

In step 202, the control device 30 starts to detect whether or not the brake operation has been performed on the communication partner vehicle 11 based on the brake data (vehicle information) of the communication partner vehicle 11 acquired from step S102. In a case where the brake operation is detected, the process proceeds to step S203, and otherwise, the process remains in step S202.

In step 203, the control device 30 determines whether or not the brake operation detection timing 54 detected in step S202 is earlier than the deceleration start estimation timing 52 calculated in step S201. If the brake operation detection timing 54 is earlier than the deceleration start estimation timing 52, the process proceeds to step S204, and if not, the process proceeds to step S107.

In step 204, the control device 30 calculates the stop position (first position) 58 of the communication partner vehicle 11 at the stop time 57 calculated in step S201 based on the location data and the velocity data (vehicle information) after the brake operation among the location data and the velocity data (vehicle information) of the communication partner vehicle 11 acquired in step S102.

In step 205, the control device 30 calculates the distance D56 between the stop position (first position) 58 calculated in step S204 and the specified stop position (second position) 50, and determines whether or not the distance D56 exceeds a predetermined value d1. When it is determined that the distance D56 exceeds the predetermined value d1, the process proceeds to step S105 to perform the process for a case where another vehicle 13 is present ahead of the communication partner vehicle 11. Otherwise, the process proceeds to step S107 to perform the process for a case where another vehicle 13 is not present. Since the subsequent processes are the same as those of the first embodiment, the description thereof is omitted.

With the processes of the control device 30 described above, the presence of the vehicle 13 can be detected even when there is the vehicle 13 incapable of vehicle-to-vehicle communication ahead of the communication partner vehicle 11, as in the first embodiment. According to the present embodiment, since the stop time (reference time) 57 is calculated in real time and the distance D56 at that time is calculated, the detection accuracy of the vehicle 13 can be improved as compared with the first embodiment. Furthermore, according to the present embodiment, since the process of detecting the vehicle 13 is performed only when the brake operation is detected, the detection accuracy of the vehicle 13 can be improved also from this viewpoint.

Third Embodiment

Figure 6:
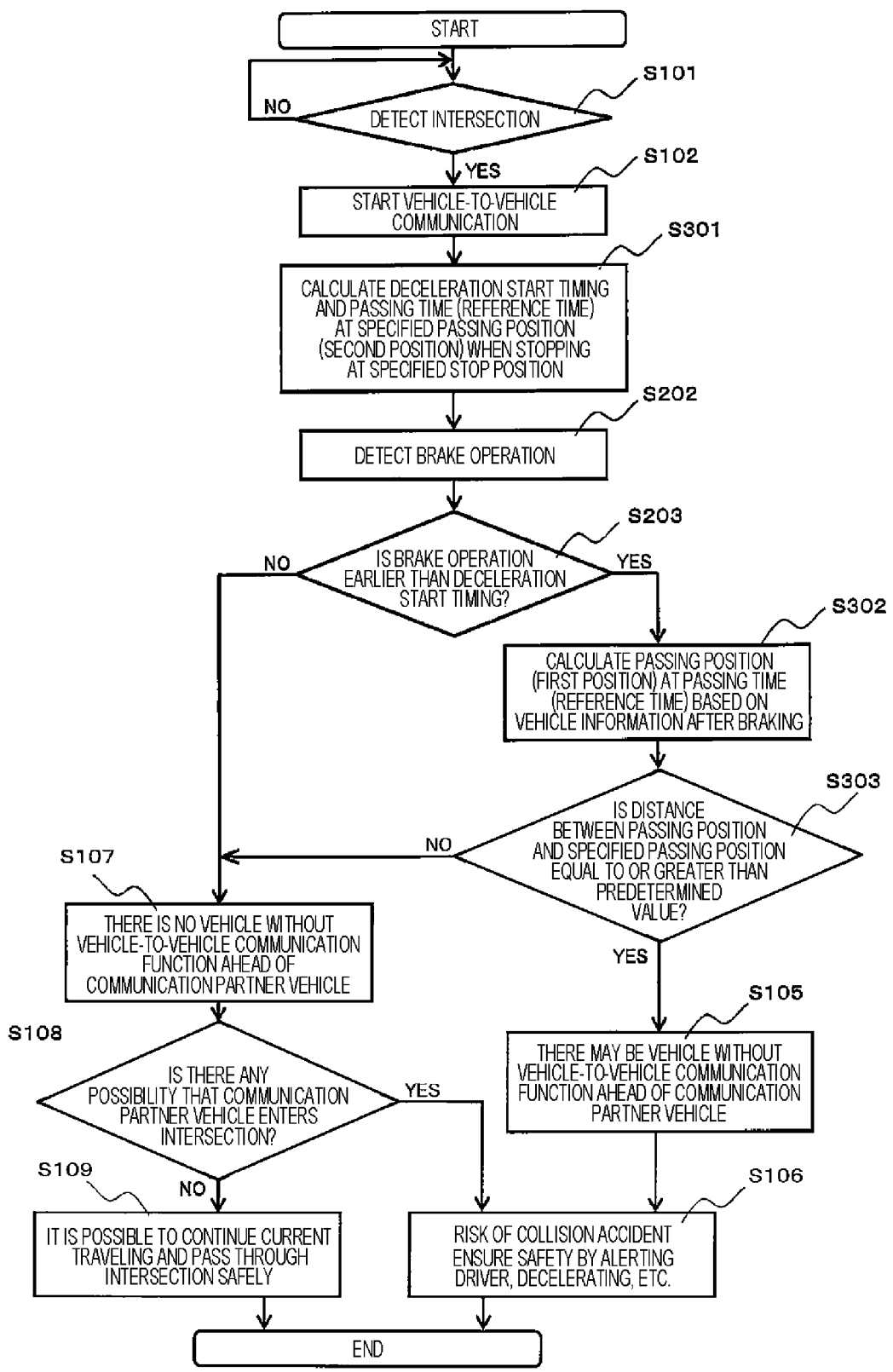
FIG. 6 is a flowchart of processes executed by a control device 30 according a third embodiment of the present invention.
Figure 7:
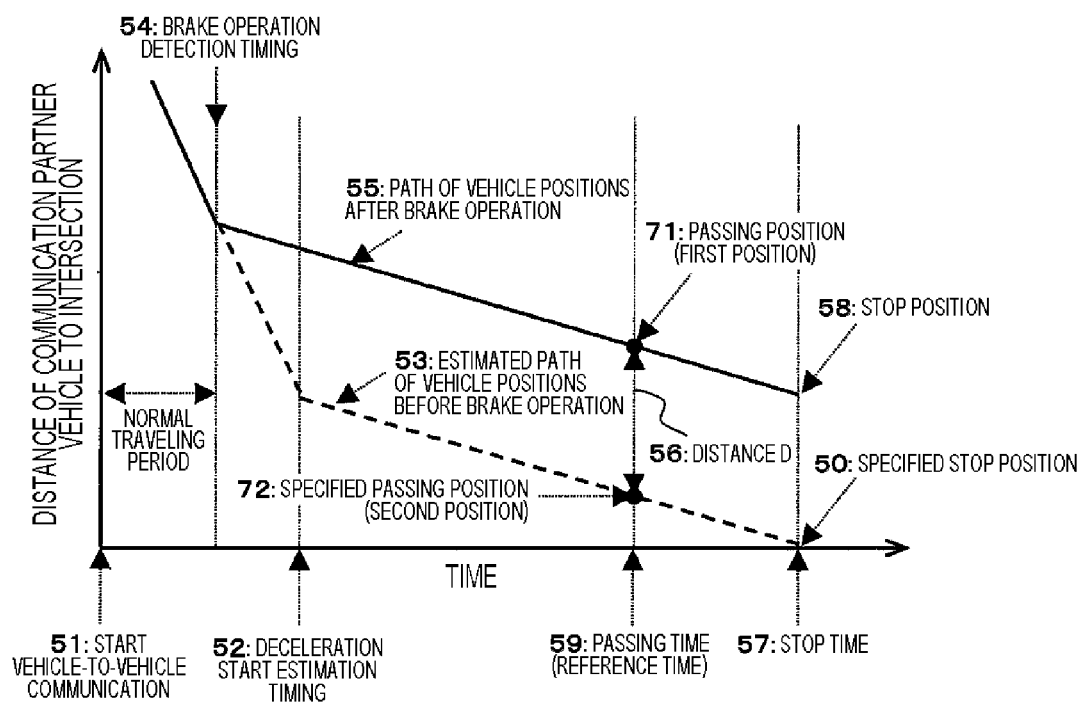
FIG. 7 is a diagram for explaining the operation of the vehicle-to-vehicle communication system according to the third embodiment of the present invention.

Next, a third embodiment which is a modification of the second embodiment will be described. FIG. 6 is a flowchart of processes executed by the control device 30 according the third embodiment of the present invention. FIG. 7 is a diagram for explaining the operation of the vehicle-to-vehicle communication system according to the third embodiment of the present invention.

According to the second embodiment, the presence or absence of the vehicle 13 is detected from the distance D between the first position (specified stop position) 50 and the second position (stop position) 58 when the communication partner vehicle 11 stops (stop time 57). However, according to the third embodiment, the presence or absence of the vehicle 13 is detected from the distance D between the first position (passing position) 71 and the second position (specified passing position) 72 at a predetermined time (passing time 59) before the communication partner vehicle 11 stops (while traveling).

The processes executed by the control device 30 according to the third embodiment will be further described with reference to the flowchart of FIG. 6. Description of the same processes as those in the flowcharts of FIGS. 2 and 4 may be omitted.

In step 301, the control device 30 calculates a deceleration start estimation timing 52 when the communication partner vehicle 11 stops at the specified stop position 50 and a passing time (reference time) 59 (see FIG. 7) at which the communication partner vehicle 11 passes through the specified passing position (second position) 72 (see FIG. 7) based on the location data and the velocity data (vehicle information) of the communication partner vehicle 11 acquired from step S102. The calculation of the passing time (reference time) 59 is performed as follows. In other words, as mentioned in the description of the second embodiment, the control device 30 calculates the estimated path 53, which is estimated values of the location changes of the communication partner vehicle 11, based on the location data and the velocity data (vehicle information) of the communication partner vehicle 11 acquired in step S102, searches for and detects the time of passing through the specified passing position (second position) 72 separately set in advance from the estimated path 53, and sets the detected time as the passing time (reference time) 59. Only the passing time 59 may be determined in advance without setting the specified passing position 72 in advance. For example, the passing time (reference time) 59 may be after a lapse of a predetermined time from the deceleration start estimation timing 52.

Although the description of steps S202, 203 following step S301 is simplified, if the brake operation detection timing 54 of the communication partner vehicle 11 is earlier than the deceleration start estimation timing 52, the process proceeds to step S302.

In step 302, the control device 30 calculates the passing position (first position) 71 of the communication partner vehicle 11 at the passing time (reference time) 59 calculated in step S301 based on the location data and the velocity data (vehicle information) after the brake operation among the location data and the velocity data (vehicle information) of the communication partner vehicle 11 acquired from step S102.

In step 303, the control device 30 calculates the distance D56 between the passing position (first position) 71 calculated in step S302 and the specified passing position (second position) 72, and determines whether or not the distance D56 exceeds a predetermined value d1. When it is determined that the distance D56 exceeds the predetermined value d1, the process proceeds to step S105 to perform the process for a case where another vehicle 13 is present ahead of the communication partner vehicle 11. Otherwise, the process proceeds to step S107 to perform the process for a case where another vehicle 13 is not present. Since the subsequent processes are the same as those of the first embodiment, the description thereof is omitted.

With the processes of the control device 30 described above, the presence of the vehicle 13 can be detected even when there is the vehicle 13 incapable of vehicle-to-vehicle communication ahead of the communication partner vehicle 11, as in the first embodiment. In particular, according to the present embodiment, since the vehicle 13 can be detected before the communication partner vehicle 11 stops, the excellent immediacy is an advantage.

Others

The embodiments described above are merely examples, and the present invention is not limited to these contents as long as the features of the invention are not impaired. The present invention is not limited to the above-described embodiments, and combinations thereof and other aspects conceivable within the scope of the technical idea of the present invention are also included in the scope of the present invention.

For example, although the intersection 60 of the above embodiment is a cross (four-way junction), the intersection may be a multi-way junction including a three-way junction and a five-way junction.

According to the above embodiment, the vehicle 11 and the vehicle 13 approach the intersection 60 via a route different from that of the host vehicle 10, but it is also possible to detect the vehicle 13 ahead of the vehicle 11 even when the vehicle 11 and the vehicle 13 approach the intersection 60 via the same route.

REFERENCE SIGNS LIST

10 host vehicle
11 communication partner vehicle
13 vehicle incapable of vehicle-to-vehicle communication
30 control device (electronic control device (ECU))
31 GNSS receiver
32 map database
34 vehicle-to-vehicle communication device

The invention claimed is:

1. An electronic control device that is mounted in a first vehicle having a vehicle-to-vehicle communication device and controls the first vehicle based on vehicle information of another vehicle, the vehicle information being received by the vehicle-to-vehicle communication device,
wherein the electronic control device comprises a processor, a memory, and a storage and is configured to:
detect, on map data, an intersection located ahead in a traveling direction of the first vehicle based on location data and the map data of the first vehicle,
calculate a first position where a second vehicle is supposed to pass through or stop when the second vehicle is to stop before the intersection, based on second vehicle information that is vehicle information of the second vehicle traveling toward the intersection and that is vehicle information of the second vehicle received by the vehicle-to-vehicle communication device, and
determine whether or not there is a third vehicle ahead in a traveling direction of the second vehicle based on positional relationship between the first position and a second position that is set in front of the intersection on a road on which the second vehicle is traveling,
wherein when determining that there is the third vehicle ahead in the traveling direction of the second vehicle, the electronic control device executes controlling a brake of the first vehicle.

2. The electronic control device according to claim 1, wherein the electronic control device determines that there is the third vehicle ahead in the traveling direction of the second vehicle in a case where a distance between the first position and the second position exceeds a predetermined value.

3. The electronic control device according to claim 1, wherein
the first position is a stop position when the second vehicle stops in front of the intersection,
the second position is within a predetermined region set on the road on which the second vehicle is traveling, and
the electronic control device determines that there is the third vehicle ahead in the traveling direction of the second vehicle in a case where the first position is outside the predetermined region.

4. The electronic control device according to claim 3, wherein the predetermined region is set on the road where the second vehicle is traveling so as to be adjacent to the intersection or include a part of or all of the intersection.

5. The electronic control device according to claim 3, wherein
the second vehicle information includes location data and velocity data of the second vehicle, and
the electronic control device calculates the first position based on the location data and the velocity data of the second vehicle.

6. The electronic control device according to claim 1, wherein
the electronic control device
calculates a reference time that is a time when the second vehicle is supposed to pass through or stop at the second position in a case where the second vehicle stops before the intersection, based on second vehicle information before a brake operation acquired via the vehicle-to-vehicle communication device before detecting the brake operation of the second vehicle, from pieces of second vehicle information, calculates a location of the second vehicle at the reference time based on second vehicle information after the brake operation acquired via the vehicle-to-vehicle communication device after detecting the brake operation of the second vehicle, from the pieces of the second vehicle information, to set the calculated position as the first position, and determines that there is the third vehicle ahead in the traveling direction of the second vehicle in a case where a distance between the first position and the second position exceeds a predetermined value.

7. The electronic control device according to claim 6, wherein the second vehicle information includes location data and velocity data of the second vehicle, and the electronic control device calculates the first position based on the location data and the velocity data of the second vehicle after the brake operation.

8. The electronic control device according to claim 6, wherein the first position is a position of the second vehicle when the second vehicle actually stops after the brake operation.

9. The electronic control device according to claim 1, wherein when determining that there is the third vehicle ahead in the traveling direction of the second vehicle, the electronic control device further executes warning a driver of the first vehicle with a notification device mounted in the first vehicle.

* * * * *